Feb. 10, 1925. 1,525,966
F. C. VICKERS
ELECTRIC CORN POPPER
Filed April 26, 1923
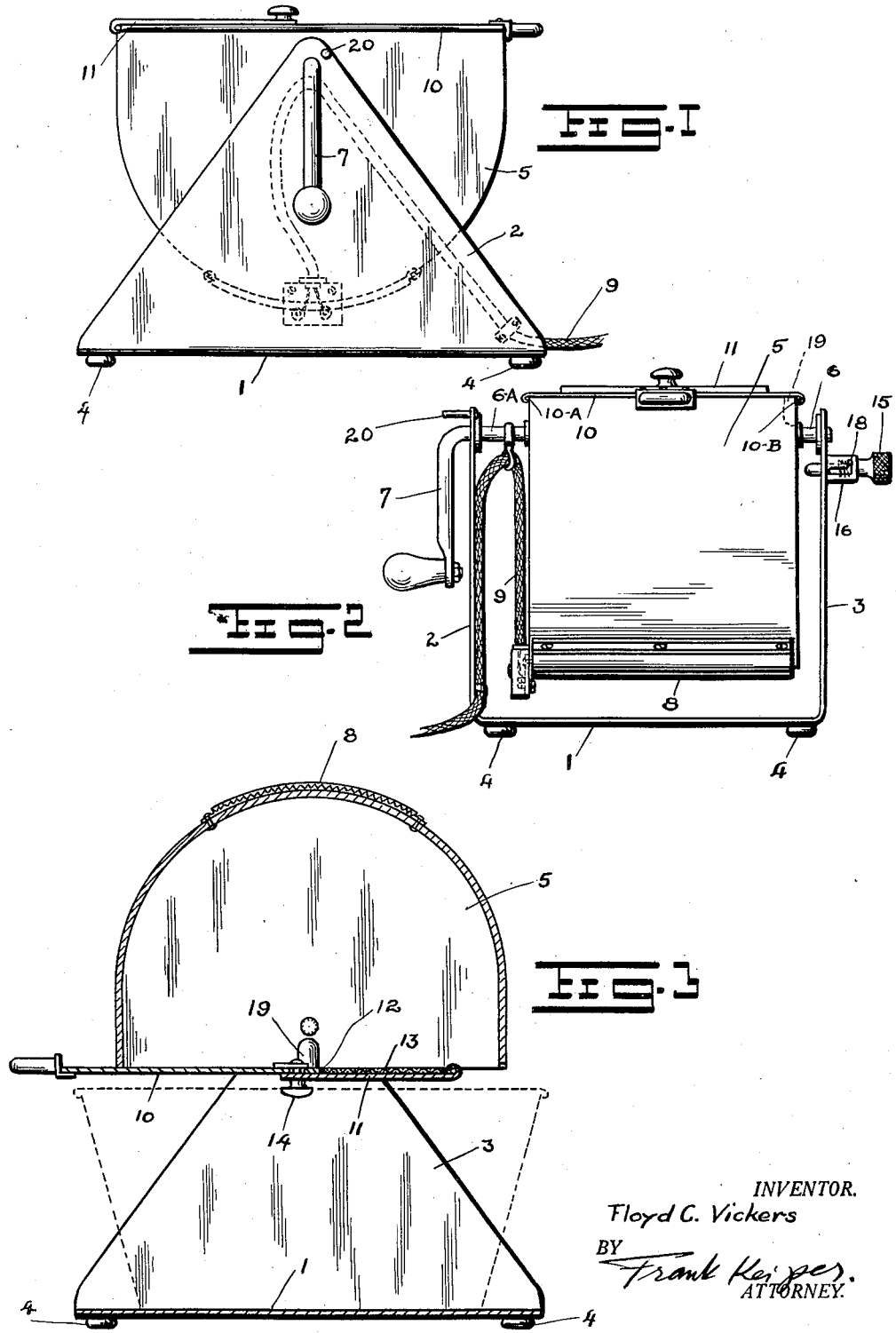
INVENTOR.
Floyd C. Vickers
BY
Frank Keiper,
ATTORNEY.

Patented Feb. 10, 1925.

1,525,966

UNITED STATES PATENT OFFICE.

FLOYD C. VICKERS, OF PERRY, NEW YORK.

ELECTRIC CORN POPPER.

Application filed April 26, 1923. Serial No. 634,818.

*To all whom it may concern:*

Be it known that I, FLOYD C. VICKERS, a citizen of the United States, residing at Perry, in the county of Wyoming and State of New York, have invented certain new and useful Improvements in Electric Corn Poppers, of which the following is a specification.

The object of this invention is to provide a new and improved type of electrically heated pop corn popper and is intended for use on the table in the same manner as many other electric appliances such as toasters, etc. that are being used at the present time.

This and other objects of this invention will be fully illustrated in the drawing, described in the specification and pointed out in the claims at the end thereof.

In the accompanying drawing:

Figure 1 is a side elevation of the electric corn popper.

Figure 2 is an end elevation of the electric corn popper.

Figure 3 is a longitudinal vertical sectional view of the electric corn popper.

In the several figures of the drawing like reference numerals indicate like parts.

The corn popper forming the subject matter of my present invention comprises a base 1 made up from a single sheet of metal with the triangular sides 2 and 3 bent up at each side thereof forming a cradle. On the under side of the base 1 are located a series of four feet 4, 4 on which the base is properly supported, the feet being preferably made up of a material that will keep the base from sliding on the table when the corn popper is operated.

Mounted to oscillate in the cradle between the two triangular sides 2 and 3 is the pan 5 having a semi-cylindrical closed bottom and a flat open top. The sides of this pan are provided near the upper end thereof with the trunnion bearings $6^A$ and 6 that are adapted to oscillate in suitable bearings in the upper ends of the sides 2 and 3 of the base 1. The trunnion bearing $6^A$ is extended to the outside of the side 2 of the base and has the crank handle 7 formed thereon. The electric heating unit 8 is fastened to the cylindrical bottom of the pan 5 with the extension wire 9 suitably connected thereto and supported on the side 2 and the trunnion bearing 6 so that the pan 5 can be oscillated by means of the crank handle 7 without interference from the wire leading to the heating unit mounted to the bottom of the pan.

The open top of the pan is closed by means of the sliding cover 10. For this purpose the sides of the pan 5 are provided with the rolled edge $10^A$ and $10^B$ over which the semi-circular channels on the sides of the cover can slide to guide the cover while opening or closing the top of the pan. The end of the cover 10 may be provided with a small trap door 11 which normally covers up the opening 12 at one end of the cover. A coarse screen 13 is mounted in this opening suitable to have the kernels of the corn that do not pop drop therethrough while retaining the popped corn within the pan as will hereinafter be described. The trap door 11 has a suitable lock handle 14 provided thereon with which it may be opened or closed.

The corn to be popped is placed in the pan 5 and the electric heating unit started. The heat generated by this heating unit then serves to pop the corn until the corn has ceased to pop. The few kernels that usually do not pop open are then discharged from the pan by swinging the pan into the reverse position illustrated in Figure 3 so that a dish can be placed under it. When the trap door 11 is opened the kernels of the corn that had not popped open will fall through the screen 13 and can be collected and thrown away. The trap door may then be closed again and the whole of the cover 10 pulled off from the reversely placed pan, allowing all of the popped corn to drop into the dish placed below it.

For the purpose of holding the pan in the reverse position while it is being emptied as above described, a locking pin 15 may be provided on the side of the base. This locking pin is mounted in a sleeve 16 provided on the side 3 of the base 1. The locking pin 15 is adapted to slide in the sleeve 16 being normally forced in one direction therein toward the side of the pan by an expansion spring surrounding the pin within the sleeve 16. A rectangular slot 17 in the sleeve 16 through which a pin 18 carried by the pin 15 projects is adapted to guide the locking pin in its longitudinal movement and provides a shoulder on the outer end of the sleeve which when engaged by the pin 18 on the turning of the pin 15 will hold the locking pin free from the side of the pan and allow a free oscillation thereof. When releasing the locking pin so that it engages the side of the pan, the inner end of the pin is adapted to engage into a small pocket formed in the side of the pan 5 thus holding this pan from further oscillation while it is being emptied as above pointed out.

In conjunction with the locking pin 15 a stop pin 20 is provided on the side 2 of the frame. This pin prevents the handle from making a complete turn so that only an oscillating motion can be given to the pan 1. This prevents the cord 9 from winding around the shaft 5 when the corn popper is operated.

Instead of providing the cover 10 with the trap door 11 the cover may be suitably perforated either over the whole of the surface or only a part thereof in order to allow the unpopped kernels to fall therethrough.

I claim:

1. In a corn popper, the combination of a cradle, a pan having a semi-cylindrical bottom and a flat top mounted to oscillate within said cradle, an electric heating unit carried on said semi-cylindrical bottom of said pan, means for oscillating said pan within said cradle, said pan being adapted to be swung into a reversible position to locate its flat top in place of the semicylindrical bottom but at a higher elevation than said semi-cylindrical bottom to allow the insertion of a dish within said cradle and below said flat top of said pan.

2. In a corn popper, the combination of a cradle, a pan mounted to oscillate within said cradle, said pan being adapted to be swung out of said cradle and placed in a reversible position above said cradle to empty the contents of said pan into a dish placed into said cradle, a heating unit carried by said pan.

3. In a corn popper, the combination of a cradle, a pan mounted to oscillate within said cradle, said pan being adapted to be swung out of said cradle and placed in a reversible position above said cradle to empty the contents of said pan into a dish placed into said cradle, a heating unit carried by said pan, a locking pin adapted to hold said pan in its reversible position while being emptied.

4. In a corn popper, the combination of a cradle, a pan mounted to oscillate in said cradle, said pan having an open flat top and a closed semi-cylindrical bottom, a heating unit mounted to the semi-cylindrical bottom of said pan, a cover for the open top of said pan, said pan being adapted to be reversed within said cradle to allow the contents thereof to drop out of the pan on the withdrawal of the cover from said pan.

5. In a corn popper, the combination of a cradle, a pan mounted to oscillate in said cradle, said pan having an open flat top and a closed semi-cylindrical bottom, a heating unit mounted to the semi-cylindrical bottom of said pan, a cover for the open top of said pan, said pan being adapted to be reversed within said cradle to allow the contents thereof to drop out of the pan on the withdrawal of the cover from said pan, said cover having an opening therein, a screen mounted in the opening in said cover, an auxiliary cover mounted on said cover to open or close the opening in said cover.

In testimony whereof I affix my signature.

FLOYD C. VICKERS.